(12) United States Patent  
Parolini et al.

(10) Patent No.: US 8,512,629 B2  
(45) Date of Patent: Aug. 20, 2013

(54) SYSTEM AND METHOD FOR ANNEALING ALLOY STEEL COMPONENTS

(75) Inventors: Jason Robert Parolini, Greer, SC (US); John Randolph Wood, Greer, SC (US)

(73) Assignee: General Electric Company, Schenectady, NY (US)

( * ) Notice: Subject to any disclaimer, the term of this patent is extended or adjusted under 35 U.S.C. 154(b) by 435 days.

(21) Appl. No.: 12/688,950

(22) Filed: Jan. 18, 2010

(65) Prior Publication Data

US 2011/0174419 A1    Jul. 21, 2011

(51) Int. Cl.
*C21D 6/00* (2006.01)

(52) U.S. Cl.
USPC .......................................... 266/258; 148/640

(58) Field of Classification Search
USPC ................. 266/258; 148/714, 627, 639, 640
See application file for complete search history.

(56) References Cited

U.S. PATENT DOCUMENTS

| | | | | |
|---|---|---|---|---|
| 2,367,715 A | * | 1/1945 | Chapman | 219/615 |
| 2,812,272 A | * | 11/1957 | Nack et al. | 427/251 |
| 3,156,807 A | * | 11/1964 | Stein et al. | 219/611 |
| 6,083,329 A | * | 7/2000 | Tsuchiya et al. | 148/526 |
| 2009/0020523 A1 | * | 1/2009 | DeMichael et al. | 219/553 |
| 2009/0057301 A1 | * | 3/2009 | Lovens | 219/645 |
| 2009/0065494 A1 | | 3/2009 | DeMichael | |
| 2009/0094832 A1 | | 4/2009 | DeMichael et al. | |

OTHER PUBLICATIONS

Patent Abstract of Japanese Patent No. 55125229, Sep. 26, 1980.
Bulloch, J.H., "Restoration of charpy toughness for 'in service' temper embrittled steels" *Theoretical and Applied Fracture Mechanics 21*, pp. 131-141, 1994 Elsevier Science B.V. Publications.

* cited by examiner

*Primary Examiner* — Scott Kastler
(74) *Attorney, Agent, or Firm* — Dority & Manning, PA

(57) ABSTRACT

A system for heat treating an alloy steel component includes a first enclosure and a second enclosure opposed to the first enclosure. The first and second enclosures define a chamber around only a portion of the alloy steel component. The system further includes a heating element in the chamber to heat the portion of the alloy steel component. A method for heat treating an alloy steel component includes placing a first enclosure against a first side of the alloy steel component and placing a second enclosure against a second side of the alloy steel component. The method further includes creating a substantially airtight chamber around only a portion of the alloy steel component between the first and second enclosures and heating the portion of the alloy steel component inside the substantially airtight chamber.

6 Claims, 3 Drawing Sheets

`US 8,512,629 B2`

SYSTEM AND METHOD FOR ANNEALING ALLOY STEEL COMPONENTS

FIELD OF THE INVENTION

The present invention generally involves systems and methods for annealing alloy steel components. In particular, the present invention describes and enables systems and methods for heat treating a portion of alloy steel components.

BACKGROUND OF THE INVENTION

Alloy steel is a combination of iron and up to 50% by weight of alloying elements such as nickel, chromium, molybdenum, manganese, vanadium, silicon, and boron. Alloy steels have greater strength, hardness, hot hardness, wear resistance, hardenability, and/or toughness compared to carbon steel. Alloy steels are further characterized by the amount of alloy added, with low alloy steels typically less than 2% to 4% by weight alloying, and high alloy steels having greater than 4% by weight alloying.

Examples of alloy steels used in commercial applications include NiCrMoV and CrMoV alloy steels. For example, NiCrMoV and CrMoV alloy steels are often included in shafts, flanges, wheels, and disks included in a gas turbine. Heat treatment of these and other alloy steels is typically required to improve the strength, hardness, wear resistance, and/or toughness characteristics of the alloy steels compared to carbon steel.

Gas turbine components typically operate in an environment of more than 600° F. for extended periods of time. Prolonged exposure of alloy steels to high operating temperatures results in thermal embrittlement of the alloy steel, particularly at or near the surface of the alloy steel. For example, thermal embrittlement is commonly experienced around bores and/or bolt holes after prolonged operations at high temperatures. The thermal embrittlement produces slight micro-structural changes in the alloy steel that reduce the fracture toughness of the alloy steel and limit the service life of the alloy steel components. The service life of alloy steel components may be determined according to various metrics, such as the amount of time that the alloy steel component is exposed to high temperatures or a decrease in the fracture toughness and/or fracture appearance transition temperature (FATT) of the alloy steel component. Any of these parameters, or others, may be used to predict the onset of thermal embrittlement which may result in excessive crack formation and/or propagation.

Alloy steel components that have experienced thermal embrittlement due to prolonged exposure to high temperature environments may be annealed using heat treatment methods known in the art. For example, the alloy steel components may be disassembled or removed and placed in a suitable chamber to heat the alloy steel components. However, the size of the alloy steel components often requires a correspondingly large chamber. In addition, removal and disassembly of the alloy steel components is time consuming, expensive, and results in extended maintenance periods during which the commercial equipment is not available for operation.

Therefore the need exists for an improved system and method for annealing alloy steel components. Ideally, the improved system and method may anneal localized areas of the alloy steel components to reduce the time and cost associated with the annealing process, thereby reducing the amount of time that the commercial equipment is inoperable.

BRIEF DESCRIPTION OF THE INVENTION

Aspects and advantages of the invention are set forth below in the following description, or may be obvious from the description, or may be learned through practice of the invention.

One embodiment of the present invention is a system for heat treating an alloy steel component. The system includes a first enclosure and a second enclosure opposed to the first enclosure. The first and second enclosures define a chamber around only a portion of the alloy steel component. The system further includes a heating element in the chamber to heat the portion of the alloy steel component.

Another embodiment of the present invention is a method for heat treating an alloy steel component. The method includes placing a first enclosure against a first side of the alloy steel component and placing a second enclosure against a second side of the alloy steel component. The method further includes creating a substantially airtight chamber around only a portion of the alloy steel component between the first and second enclosures and heating the portion of the alloy steel component inside the substantially airtight chamber.

Those of ordinary skill in the art will better appreciate the features and aspects of such embodiments, and others, upon review of the specification.

BRIEF DESCRIPTION OF THE DRAWING

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
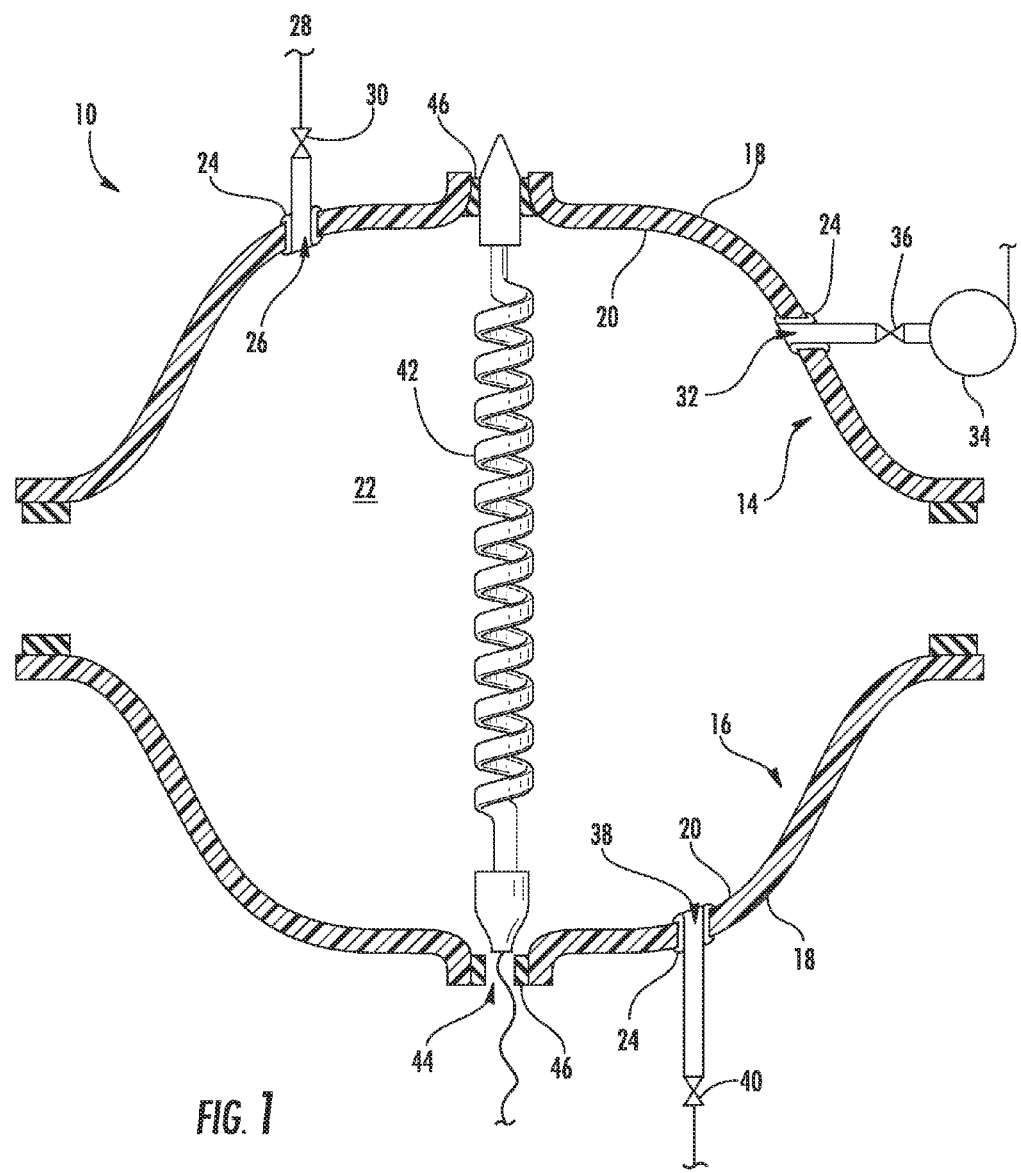
FIG. 1 shows a cross-section of a system for annealing alloy steel components according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof For instance, features illustrated or described as part of one embodiment may be used on another embodiment to yield a still further embodiment. Thus, it is intended that the present invention covers such modifications and variations as come within the scope of the appended claims and their equivalents.

FIG. 1 shows a cross-section of a system 10 for heat treating an alloy steel component according to one embodiment of the present invention. As shown, the system 10 includes a first enclosure 14 and a complimentary second enclosure 16. The first and second enclosures 14, 16 may be made from any suitable material capable of withstanding continuous and cyclic temperatures up to approximately 1,300 degrees Fahrenheit. For example, the first and second enclosures 14, 16 may be made from steel, alloy steel, fiberglass, or similar materials known to one of ordinary skill in the art. The first and second enclosures 14, 16 may be circular, square, oval, or any other suitable shape to accommodate the alloy steel component to be annealed. The length and width of the first and second enclosures 14, 16 may be selected to accommodate the portion of the alloy steel component to be annealed.

Each enclosure 14, 16 includes an outer surface 18 and an inner surface 20. When installed around the portion of the alloy steel component to be annealed, the inner surfaces 20 define a cavity or chamber 22 between the enclosures 14, 16 and around the portion of the alloy steel component to be annealed. The first and second enclosures 14, 16 may further include gaskets 24, grommets, o-rings, or similar devices for creating an airtight seal and making the chamber 22 substantially airtight.

The first and second enclosures 14, 16 may further include one or more ports to accommodate peripheral equipment. For example, as shown in FIG. 1, the first enclosure 14 may include a gas port 26 that provides a fluid communication between a supply of gas 28 and the first enclosure 14. The supply of gas 28 may connect to the gas port 26 through an isolation valve 30 to permit or prevent the flow of the gas to the first enclosure 14. The supply of gas 28 may provide any suitable gas for establishing a desired environment around the alloy steel component. For example, the supply of gas 28 may provide inert gases, such as argon or nitrogen, to surround the alloy steel component during the annealing process. The inert gas environment may reduce oxidation or decarburization caused by ambient air in the chamber 22 during the annealing process.

The first enclosure 14 may further include a vacuum port 32 to connect a vacuum pump 34 to the first enclosure 14. The vacuum pump 34 may be used to draw a vacuum on the chamber 22 defined by the first and second enclosures 14, 16. The vacuum port 32 may include an isolation valve 36 between the vacuum port 32 and the vacuum pump 34 to isolate the first enclosure 14 when the vacuum pump 34 is not in use.

As further shown in FIG. 1, the second enclosure 16 may include a drain port 38 connected to an isolation valve 40. The drain port 38 may be used to drain or purge ambient air or gas from the chamber 22 during various stages of the annealing process. Although the location of the ports have been described with respect to the embodiment illustrated in FIG. 1, it should be understood that in alternate embodiments the ports may be in either or both of the first and/or second enclosures 14, 16.

The system 10 also includes an induction coil 42 or similar heating element that extends through the first and second enclosures 14, 16 into the chamber 22 defined by the first and second enclosures 14, 16. The induction coil 42 or other suitable heating element provides the heat source for heating the chamber 22 defined by the first and second enclosures 14, 16, thereby heating the portion of the alloy steel component to be annealed. The size of the induction coil 42 or suitable heating element depends on the size of the alloy steel component to be annealed and the desired heat up rate to be achieved. Openings 44 in the first and second enclosures 14, 16 may include gasket material 46, insulation, rubber, or similar materials to accommodate induction coils 42 or other suitable heating elements of various sizes and to provide a suitable seal between the induction coil 42 and the first and second enclosures 14, 16.

Figure 2:
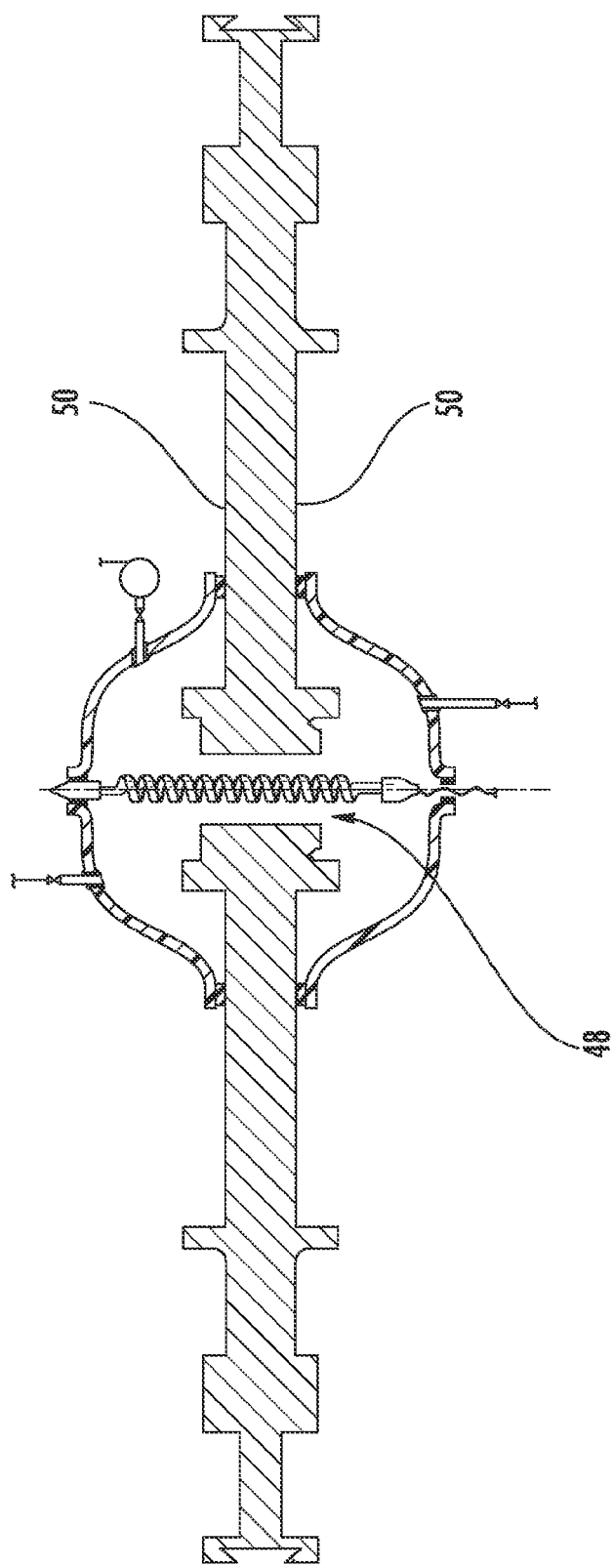
FIG. 2 shows the embodiment shown in FIG. 1 installed around an alloy steel component.

FIG. 2 shows a cross-section of the system 10 shown in FIG. 1 installed on the alloy steel component to be annealed. In this illustration, the alloy steel component is a disk of a gas turbine rotor, and the system 10 is installed to enclose and anneal a bore 48 in the disk. As shown in FIG. 2, the first and second enclosures 14, 16 are installed on opposite sides 50 of the alloy steel component. As a result, the chamber 22 between the enclosures 14, 16 and around the portion of the alloy steel component to be annealed is substantially airtight. The induction coil 42 or other suitable heating element extends through the first and second enclosures 14, 16 to provide localized heat to the chamber 22, and thus the portion of the alloy steel component to be annealed.

The system 10 shown in FIGS. 1 and 2 may be used for heat treating an alloy steel component in the following manner. The first enclosure 14 is placed against one side 50 of the alloy steel component to be annealed, and the second enclosure 16 is placed against the other side 50 of the alloy steel component to be annealed. The first and second sides 50 of the alloy steel component to be annealed may be opposite sides or adjacent sides that include the particular portion of the alloy steel component to be annealed. The chamber 22 defined by the first and second enclosures 14, 16 around the portion of the alloy steel component to be annealed is substantially airtight.

The isolation valve 40 for the drain port 38 may be opened independently or in conjunction with the inert isolation valve 30 for the gas port 26 to purge the chamber 22 of air. If desired, the supply of gas 28 may provide inert gas or other medium to the chamber 22. In still further applications, the isolation valve 36 for the vacuum port 32 may be opened, and the vacuum pump 34 may be operated to draw a vacuum on the chamber 22.

The induction coil 42 or other suitable heating element may then be energized to heat the substantially airtight chamber 22 to at least 1,000 degrees Fahrenheit to anneal the local portion of the alloy steel component. The induction coil 42 or other suitable heating element may heat the substantially airtight chamber at rates exceeding 500 degrees Fahrenheit per hour, and in some particular embodiments greater than 1,000 degrees Fahrenheit per hour. The temperature may then be maintained, preferably between 1,000 and 1,200 degrees Fahrenheit, for a suitable time to effect the desired annealing of the alloy steel component. For example, suitable annealing may be accomplished by maintaining the temperature of the substantially airtight chamber 22 above 1,000 degrees Fahrenheit for at least 1 to 2 hours per inch thickness of the alloy steel component.

After the annealing temperature has been maintained in the substantially airtight chamber 22 for the desired amount of time, the induction coil 42 or other suitable heating element may be de-energized to allow the alloy steel component to cool to room temperature. The isolation valves 30, 40 for the gas port 26 and/or the drain port 38 may be opened to allow cooling air and/or inert gas to flow through the chamber 22 to achieve a desired cool down rate of the alloy steel component to minimize any temperature embrittlement as the alloy steel component cools down. Higher cooling rates are preferred as the temperature of the alloy steel component decreases between 1,000 degrees and 700 degrees Fahrenheit to reduce the opportunity for the allow steel component to experience temperature embrittlement at these temperatures, thus negating some of the effects of the annealing process. For example, cooling air may be regulated to achieve a cool down rate of 100 to 150 degrees Fahrenheit per hour until the temperature of the alloy steel component is less than approximately 700° F. Once the temperature of the alloy steel component is less than approximately 700° F., a slower cool down rate may be used until the alloy steel component reaches room temperature.

The temperature of the chamber 22 and/or alloy steel component to be annealed may be carefully monitored during the annealing process. For example, a thermocouple, pyrometer, resistance temperature detector, infrared laser, or similar instrument may be installed in the chamber 22 or against the local portion of the alloy steel component to be annealed to monitor the temperature, heat up rate, and cool down rate of the system 10.

Figure 3:
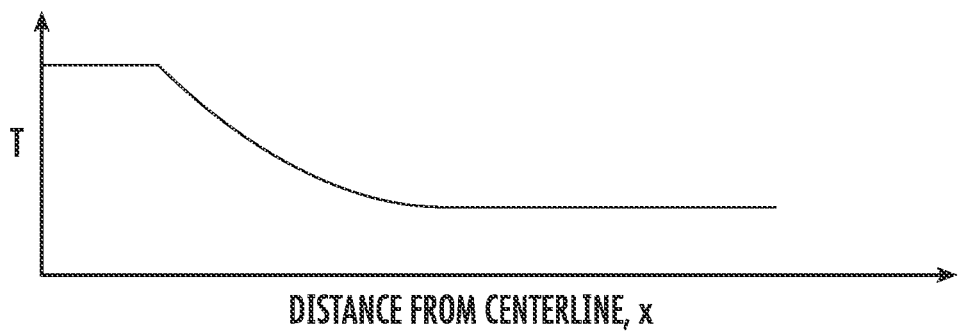
FIG. 3 shows an anticipated temperature profile during the annealing process.

FIG. 3 shows an anticipated temperature profile for the system 10 during the annealing process. As shown in FIG. 3, the induction coil 42 or other suitable heating element maintains the temperature in the substantially airtight chamber 22 at the desired temperature to effect annealing of the localized portion of the alloy steel component. Due to the localized heating provided by the induction coil 42 or other suitable heating element, the temperature rapidly decreases outside of the chamber 22, as shown by the decreasing temperature curve in FIG. 3. As a result, the system 10 and method of the present invention does not distort or create residual stresses in the remainder of the alloy steel component outside of the chamber 22.

The system 10 and methods described in the present invention allow for local areas of alloy steel component to be annealed, thereby restoring the fracture toughness of the alloy steel to approach or equal the original fracture toughness of the designed component. The system 10 and method allow the alloy steel component to be annealed in place or with minor disassembly, avoiding the need for larger chambers and reducing the amount of time that the commercial equipment is inoperable. In addition, the localized heat treatment of the alloy steel component reduces any distortion or residual stresses that may be created by heat treating the entire alloy steel component.

The alloy steel components to be annealed may be treated individually or in a batch process. For example, the rotor disk shown in FIG. 2 may be individually treated, or it may be treated partially stacked with other rotor disks. Although FIG. 2 shows the system 10 treating the bore 48 through the rotor disk, the system 10 may be readily adapted to enclose other portions of the rotor disk, such as bolt holes or other surfaces.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for heat treating an alloy steel component, comprising:
   a. a first enclosure;
   b. a second enclosure opposed to the first enclosure, wherein the first and second enclosures define a chamber around only a portion of the alloy steel component;
   c. a heating element in the chamber to heat the portion of the alloy steel component;
   d. a supply of inert gas connected to at least one of the first enclosure or the second enclosure;
   e. at least one drain through at least one of the first enclosure or the second enclosure; and
   f. a vacuum pump connected to at least one of the first enclosure or the second enclosure.

2. The system for heat treating an alloy steel component as in claim 1, further including at least one port through at least one of the first enclosure or the second enclosure.

3. The system for heat treating an alloy steel component as in claim 1, wherein the heating element includes an induction coil.

4. A system for heat treating an alloy steel component, comprising:
   a. a first enclosure;
   b. a second enclosure opposed to the first enclosure, wherein the first and second enclosures define a chamber around only a portion of the alloy steel component;
   c. a heating element in the chamber to heat the portion of the alloy steel component;
   d. at least one drain through at least one of the first enclosure or the second enclosure; and
   e. a vacuum pump connected to at least one of the first enclosure or the second enclosure.

5. The system for heat treating an alloy steel component as in claim 4, further including at least one port through at least one of the first enclosure or the second enclosure.

6. The system for heat treating an alloy steel component as in claim 4, wherein the heating element includes an induction coil.

* * * * *

UNITED STATES PATENT AND TRADEMARK OFFICE
CERTIFICATE OF CORRECTION

PATENT NO. : 8,512,629 B2
APPLICATION NO. : 12/688950
DATED : August 20, 2013
INVENTOR(S) : Parolini et al.

It is certified that error appears in the above-identified patent and that said Letters Patent is hereby corrected as shown below:

In the Specification

In Column 2, Line 54, delete "thereof" and insert -- thereof. --, therefor.

Signed and Sealed this
Fifth Day of November, 2013

Teresa Stanek Rea
*Deputy Director of the United States Patent and Trademark Office*